United States Patent
Sweeting

(10) Patent No.: US 8,165,943 B2
(45) Date of Patent: *Apr. 24, 2012

(54) SYSTEM AND METHOD FOR PROVIDING FUTURES CONTRACTS IN A FINANCIAL MARKET ENVIROMENT

(75) Inventor: Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,127

(22) Filed: Mar. 14, 2011

(65) Prior Publication Data

US 2011/0166985 A1 Jul. 7, 2011

Related U.S. Application Data

(63) Continuation of application No. 10/689,185, filed on Oct. 20, 2003, now Pat. No. 7,908,193.

(51) Int. Cl.
*G06Q 40/10* (2006.01)

(52) U.S. Cl. .......................... 705/35; 705/37

(58) Field of Classification Search .................. 705/35, 705/37
See application file for complete search history.

(56) References Cited

U.S. PATENT DOCUMENTS

| | | | |
|---|---|---|---|
| 4,903,201 A | 2/1990 | Wagner | |
| 5,202,827 A | 4/1993 | Sober | |
| 5,262,942 A | 11/1993 | Earle | |
| 5,774,880 A | 6/1998 | Ginsberg | |
| 5,857,176 A | 1/1999 | Ginsberg | |
| 5,884,286 A | 3/1999 | Daughtery, III | |
| 5,905,974 A | 5/1999 | Fraser et al. | |
| 5,970,479 A | 10/1999 | Shepherd | |
| 7,212,997 B1 | 5/2007 | Pine et al. | |
| 7,315,838 B2 | 1/2008 | Gershon | |
| 7,389,262 B1 * | 6/2008 | Lange | 705/37 |
| 2002/0138299 A1 | 9/2002 | Nations | |
| 2004/0199451 A1 | 10/2004 | Benning et al. | |

FOREIGN PATENT DOCUMENTS

| | | |
|---|---|---|
| JP | 2002-063366 | 2/2002 |
| JP | 9-147030 | 10/2004 |
| JP | 2004-531795 | 10/2004 |
| JP | 09-147030 | 6/2009 |
| WO | WO02/069109 | 9/2002 |

OTHER PUBLICATIONS

Lorenzo Codogno FMS Debt Collection and The Debt Collection Improvement Act of 1996 (EC Directorate General Publication)(Mar. 2003).*

U.S. PTO Office Action for U.S. Appl. No. 10/689,185; 8 pages; Jan. 2, 2009.

(Continued)

*Primary Examiner* — Elizabeth Rosen
*Assistant Examiner* — Abdul Basit

(57) ABSTRACT

A method for offering an asset in a financial environment is provided that includes receiving a request to perform a selected one of a purchasing and a selling operation for a futures contract. The futures contract includes a first asset class having a first value associated therewith and a second asset class having a second value associated therewith. A price for the futures contract is determined at least partially by the first and second values.

23 Claims, 2 Drawing Sheets

OTHER PUBLICATIONS

U.S. Appl. No. 10/689,185; 53 pages; filed Oct. 20, 2003.
AU Examination Report for AU Application No. 2004286589 ; Sep. 14, 2009; 4 pages.
U.S. Appl. No. 10/689,185; 19 pages; Nov. 10, 2009.
Office Action for Japanese Application No. 2006-536717; Feb. 23, 2010 with 3 pages of Translation.
EP Office Action for Application No. 04795705.5 dated Feb. 17, 2009; 5 pages; (No Art).
International Preliminary Examination report for PCT/US04/34576 dated Apr. 24, 2006; 4 pages.
"Market Quality and Trader behavior in Manipulated Market Anatomy of a Squeeze" by Merrick, Naik, and Yadav; Aug. 15, 2002; 53 pages.
Office Action for Japanese Application No. 2006-536717; Oct. 26, 2010 with 4 pages of Translation (total 7 pages).
AU Examination Report for AU Application No. 2004286589 ; May 31, 2011; 2 pages.
AU Examination Report for AU Application No. 2004286589 ; Jun. 8, 2011; 3 pages.
Notice of Allowance for U.S. Appl. No. 10/689,185; Jan. 24, 2011; 8 pages.

* cited by examiner

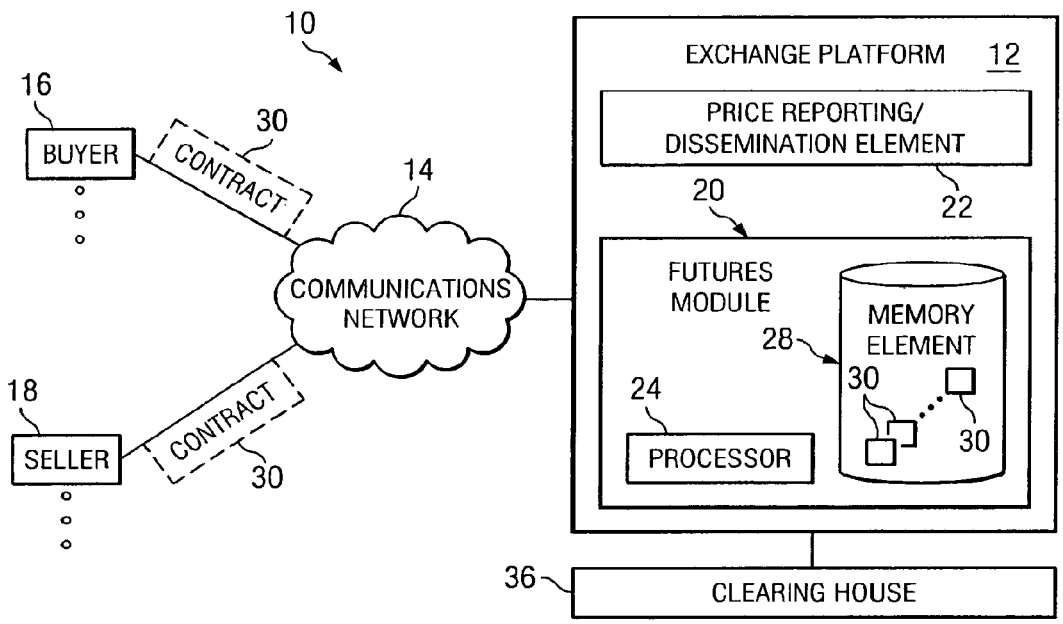

FIG. 1

| | CONTRACT | MATURITY | FIXED COUPON |
|---|---|---|---|
| 1 | ASSET SUBCLASS 1 = GERMAN GOVERNMENT BOND | 25- 35 YEAR | 6.0% |
| 2 | ASSET SUBCLASS 2 = ITALIAN GOVERNMENT BOND | 25- 35 YEAR | 6.0% |
| 3 | ASSET SUBCLASS 3 = FRENCH GOVERNMENT BOND | 25- 35 YEAR | 6.0% |

SETTLEMENT TERMS
........
........
DAILY SETTLEMENT PRICE
........
........

DELIVERY TERMS
........
........
DELIVERY NOTIFICATION
DELIVERY MONTHS/DAY
........

EXCHANGE FEES
........
........
PAYMENT TERMS
........
........

LIMITATIONS
........
POSITION LIMITS
........
MARGINAL REQUIREMENTS
DAILY PRICE LIMITS

MISCELLANEOUS ITEMS
........
........
........
........
........

FIG. 2

SYSTEM AND METHOD FOR PROVIDING FUTURES CONTRACTS IN A FINANCIAL MARKET ENVIROMENT

This application is a continuation of U.S. patent application Ser. No. 10/689,185 filed Oct. 20, 2003 now U.S. Pat. No. 7,908,193 by Michael Sweeting, and entitled System and Method for Providing Futures Contracts in a Financial Market Environment, which is hereby incorporated by reference herein in its entirety.

TECHNICAL FIELD OF THE INVENTION

This invention relates in general to futures contracts and, more particularly, to a system and method for providing a cumulative asset class futures contract in a financial market environment.

BACKGROUND OF THE INVENTION

Financial markets generally afford the opportunity for investors to purchase an asset in order to achieve some degree of profitability. Investment vehicles such as stocks, trusts, mutual funds, pension funds, money markets, and bonds represent example investment instruments that offer investors a choice for allocating capital. One investment vehicle that has enjoyed sustained success, increased notoriety, and the prospect for optimal yields is the futures contract.

A futures contract is an agreement to buy or to sell a specific quantity of some asset at some time in the future, whereby the price of the asset is agreed upon at the time the agreement is made. Any asset whose future price is uncertain is a candidate for a futures contract. Example assets include government issued bonds, corn, wheat, cotton, coffee, cocoa, pork bellies, gasoline, heating oil, lumber, live cattle, gold, silver, yen, pounds, pesos, marks, T-bills, Eurodollar CDs, or any other suitable asset or commodity.

In any given marketplace, there are generally enough consumers and producers who want to diminish the price uncertainty (hedgers) and enough other traders willing to take on that risk (speculators) in order for the futures contract to be successful, i.e., worthwhile for the contract to be listed on a futures exchange.

Unlike a stock, which represents equity in a company and an asset that can be held for a long time, (if not indefinitely), a futures contract generally has a finite life. A futures contract can be used for hedging commodity price-fluctuation risks or for taking advantage of price movements, rather than for the buying or selling of the actual cash commodity. The word "contract" is used to describe a futures arrangement because a futures contract requires delivery of the commodity at a stated time in the future unless the contract is liquidated before it expires.

A buyer of a futures contract (the party having a long position) can agree on a fixed purchase price to buy the underlying commodity (wheat, gold or T-bills, for example) from the seller at the expiration of the contract. The seller of a futures contract (the party having a short position) can agree to sell the underlying commodity to the buyer at expiration at the fixed sales price. As time passes, the contract's value changes relative to the fixed price at which the trade was initiated. This creates profits or losses for the trader. In most cases, delivery associated with the futures contract does not take place. Instead, both the buyer and the seller, acting independently of each other, usually liquidate their long and short positions before the contract expires.

The endeavor of futures contracts is generally a zero-sum equation. Futures contracts are marked to market daily. A futures contract generally has no value when purchased or sold initially. During a given trading day, as the price fluctuates, the futures contract will take on value depending on whether the market price rises or falls and whether the trader was long (bought the contract) or short (sold the contract). Whatever gain or loss that was achieved during the day is added to or subtracted from the trader's account at the end of each trading day.

Futures trading is highly leveraged. For example, the price change on a $1,000,000 Eurodollar CD can be controlled with a margin of about only $700. These margins are not a down payment on the contract. The margins are good faith deposits against an adverse change in price. The loss on a futures contract can be much greater than the margin. If the loss is greater than the funds in the trader's account, the trader must put in more money. Such a payment is normally triggered by a 'margin call' issued by the trading exchange.

SUMMARY OF THE INVENTION

Two components for any participant in a futures market are liquidity and diversity. Liquidity refers to the ability to freely buy and sell an asset in a given marketplace. Diversification refers to the ability to offer a choice for investors such that risk can be distributed among a host of investment vehicles. Diversity spawns interest and helps protect an investor against sharp marketplace fluctuations.

The non-homogeneous nature of most physical commodity and financial markets, along with the market preferences for certain types of grades of an underlying asset in a futures contract may result in a physical delivery "squeeze" of the most favored asset for delivery. If a particular standard or grade of a physical commodity is the cheapest to store and deliver in a future obligation, or if a specific bond or stock is clearly the cheapest to deliver in a futures contract, then market participants can seek to profit by controlling most of the market availability in that particular asset to influence the price of the futures contract with respect to the more general market for that asset class.

Accordingly, the ability to provide a futures contract that is not subject to the possibility of a price squeeze for the underlying cheapest to deliver asset presents a significant challenge to anyone engaged in the endeavour of futures trading. It is similarly challenging to provide such an investment vehicle that would cover more than one asset class and, thereby, offer a more diverse exposure to related underlying markets. Additionally, it would be optimal if such a futures contract would not be subject to artificial position limits applied to market participants.

From the foregoing, it may be appreciated by those skilled in the art that a need has arisen for an improved investment instrument that provides for enhanced flexibility, liquidity, and diversification for participating investors. In accordance with an embodiment of the present invention, a system and a method for offering one or more futures contracts in a financial market environment are provided that substantially eliminate or greatly reduce disadvantages and problems associated with conventional investment approaches and instruments.

According to an embodiment of the present invention, a method for providing a futures contract is offered that reflects a multiple asset class investment instrument and includes receiving a request to perform a selected one of a purchasing and a selling operation for a futures contract. The futures contract includes a first asset class having a first value associated therewith and a second asset class having a second value associated therewith. A price for the futures contract is determined at least partially by the first and second values. A change in the first value due to a cheapest to deliver parameter results in a change in the second value.

According to another embodiment of the present invention, a method for providing a futures contract is offered that reflects a single asset class structure having multiple asset subclasses and includes receiving a request to perform a selected one of a purchasing and a selling operation for a futures contract. The futures contract includes an asset class that includes a first asset subclass having a first value associated therewith and a second asset subclass having a second value associated therewith. A price for the futures contract is determined at least partially by the first and second values. A change in the first value due to a cheapest to deliver parameter results in a change in the second value.

Certain embodiments of the present invention may provide a number of technical advantages. For example, according to one embodiment of the present invention, an investment structure is provided that allows potential investors to participate in an investment instrument that reflects multiple asset classes or a single asset class having multiple subclasses. The existence of multiple delivery obligations reduces the chance of a delivery squeeze at contract termination because no single instrument can become clearly cheapest to deliver (CTD) by any appreciable margin. Moreover, such an investment structure would avoid a single security deliverable bias that may inhibit certain types of futures contract arrangements.

Yet another advantage of an embodiment of the present invention is increased liquidity. The investment vehicle provided by the present invention offers a new hybrid asset that is reflected by a cumulative multiple asset class or multiple subclass configuration. This new configuration precludes market participants from seeking to profit by controlling a majority of the market availability in a particular asset in order to influence the price of the futures contract with respect to the more general market in that asset class or subclass. Such a monopoly strategy can inhibit liquidity and is addressed by the proposed futures contract structure.

Still another advantage associated with an embodiment of the present invention is increased diversity. The asset classes for delivery in a multiple asset class or multiple asset subclass futures contract may be non-correlative. Thus, a broader market may be represented by the futures contract. Previously, broader market representation has been sought through cash settlement at termination based upon the value of an index of the underlying instrument prices. Due to the nature of traditional deliverable futures contracts, any contract with a broad deliverable basket of assets suffers from the accentuation of a CTD instrument, or from the inability of a contract standard to deliver equivalent valuations for differing asset classes. A cumulative asset class futures contract has the ability to represent a wider underlying market, while maintaining the principles of the underlying instrument versus futures delivery price convergence.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of an investment system for providing a futures contract in a financial market environment in accordance with an embodiment of the present invention;

FIG. 2 is a simplified block diagram of an example futures contract in accordance with an embodiment of the present invention.

DETAILED DESCRIPTION

Figure 3:
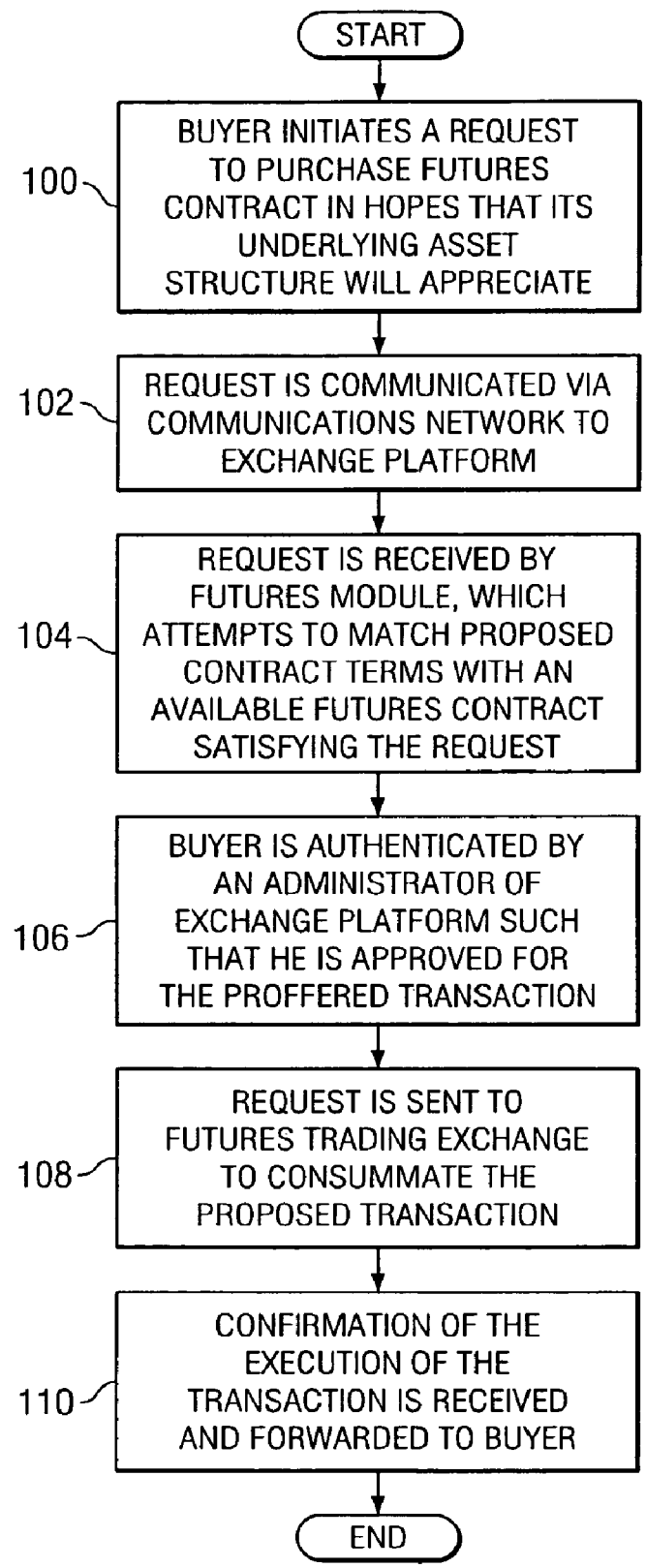
FIG. 3 is a flowchart illustrating a series of example steps associated with a method for providing a futures contract in a financial market environment.

Traditional futures contracts are either deliverable on a single asset class or cash settled on an index of the prices of multiple underlying instruments within an asset class. For example, the standard thirty year United States government bond futures contract is based upon a notional thirty year United States government bond of six percent coupon and thirty year maturity. A Standard and Poors 500 futures contract is based upon an index value of 500 underlying stocks (the S&P 500), and a Chicago grain futures contract is based upon a particular grade of corn.

Futures contracts that accept terminal delivery of the underlying asset class allow for differing instruments in the deliverable "basket" by conversion factors (in the case of financial futures) or product grading factors (in the case of commodities contracts). This allows for the notional standard of the futures contract to be upheld upon delivery, while facilitating the economic structure for physical delivery of the underlying asset.

Although the conversion formulae facilitate physical delivery, the non-homogeneous nature of most physical commodity and financial markets, along with the market preferences for certain types of grades of the underlying asset, sometimes results in a physical delivery squeeze of the most favored asset for delivery. If a particular standard or grade of a physical commodity is the cheapest to store and deliver according to a future obligation, or if a specific bond or stock is clearly the cheapest to deliver (CTD) in a financial futures contract, then market participants can seek to profit by controlling most of the market availability in that particular asset to influence the value of the futures contract with respect to the more general market for that asset class.

FIG. 1 is a simplified block diagram of an investment system 10 for providing futures contracts in a financial market environment. Investment system 10 comprises an exchange platform 12, a communications network 14, a buyer 16, and a seller 18. Exchange platform 12 may include a futures module 20 and a price reporting/dissemination element 22. Futures module 20 may include a processor 24 and a memory element 28, which may store one or more futures contracts 30. Exchange platform 12 may be coupled to a clearing house 36.

In accordance with the teachings of the present invention, investment system 10 facilitates the trading of futures contract 30. In traditional trading of futures contracts the underlying asset is susceptible to being manipulated in price terms to affect the "basis" price difference between futures contract 30 and the underlying asset(s) at terminal delivery. Investment system 10 addresses such an issue by providing a cumulative investment vehicle that includes multiple asset classes or multiple subclasses within a single asset class. Investment system 10 may offer futures contract 30 in any suitable financial market place, whereby futures contract 30 provides for a hybrid deliverable instrument. The underlying assets of futures contract 30 may extend across multiple asset classes, or multiple subclasses, and may include a wide array of investment opportunities as more fully detailed herein.

Single-security deliverables generally bear a bias that inhibits their marketability. Moreover, single-security deliverables suffer from deficient liquidity constraints and poor diversity offerings. Investment system 10 addresses such inadequacies by offering futures contract 30 that reflects an amalgamation of underlying assets, which provide for a multiple instrument delivery. The multiple asset class or multiple asset subclass futures contract configuration is such that the multiple underlying deliverable assets cumulatively make up the total deliverable obligation.

Whereas traditional futures contracts allow different instruments to be delivered as a block to fulfil a deliverable obligation, futures contract 30 can stipulate that each asset class, or subclass, forms a particular percentage of the total contract. The cumulative value of the individual asset sectors constitutes the aggregated value of futures contract 30. The structure of such a hybrid investment instrument effectively widens the appeal of futures contract 30 because instead of having, for example, one basket of a given futures contract with four different bonds, futures contract 30 may provide three baskets of four different bonds. Thus, because all three baskets must be delivered, squeezing one element will increase the implied price of the other two. In order to attempt to profit from such a squeeze, a person would have to squeeze all three baskets; such a strategy is cost prohibitive and, generally, cannot be achieved within any sensible financial risk-reward scenario.

In certain embodiments of the present invention, the existence of multiple delivery obligations reduces the chances of a delivery squeeze at contract termination because no one instrument can become clearly cheapest to deliver by an appreciable margin. If market participants choose to attempt to control any one CTD obligation, the subsequent effect on futures contract 30 is a change in the value paid for the other remaining obligations. If the exchange delivery settlement prices (EDSP) paid at contract termination are raised for the other sectors' delivery obligations, then the result is to balance any losses resulting from the squeeze in one sector with profits from the other sectors. Thus, in a general sense, futures contract 30 offers a cumulative investment vehicle that counter-balances the ill effects of a CTD parameter.

The asset classes for delivery in a multiple asset class or multiple asset subclass futures contract may be non-correlative. Thus, a broader market may be represented by futures contract 30. Previously, broader market representation has been sought through cash settlement at termination based upon the value of an index of the underlying instrument prices. Due to the nature of traditional deliverable futures contracts, any contract with a broad deliverable basket of assets suffers from the accentuation of a CTD instrument, or from the inability of a contract standard to deliver equivalent valuations for differing asset classes. A multiple asset class futures contract structure has the ability to represent a wider underlying market, while adhering to the principles of the underlying instrument versus futures delivery price convergence.

Note that as defined herein, asset class includes a broad range of financial categories and may refer to any investment sector such as government bonds, T-bills, corporate debt, credit sector debt, pension funds, money markets, trusts, mutual fund shares, stocks, Eurodollar CDs, corn, wheat, cotton, coffee, cocoa, pork bellies, gasoline, heating oil, lumber, live cattle, gold, silver, yen, pounds, pesos, marks or any other suitable bond, commodity, currency or debt instrument. The term asset class may also be inclusive of any other suitable investment class, category, division or grouping in a financial market where appropriate and based on particular needs. Subclasses within the asset class may refer to any investment vehicle that could be designated as belonging to the group or family of its associated asset class. For example, a German bond could represent a subclass of a fixed income government bond asset class. In other cases, multiple grades or standards within any given asset class or commodity may represent subclasses. Thus, a particular grade of wheat would be a subclass of the more generic asset class 'wheat commodity.' It should be appreciated that such designations and categorizations are flexible and may be made in accordance with particular market scenarios and investment arrangements. The designation of classes or subclasses is adaptable and can be varied considerably, where appropriate, such that futures contract 30 is capable of offering multiple deliverables in an investment vehicle in order to address a potential squeeze for a particular asset.

Deliverable bonds in traditional single asset class bond futures contracts are generally subject to delivery price adjustments by the futures exchanges on which they are traded. Their values are adjusted by a series of conversion factors in an attempt to equalize the economic status of each bond to fit delivery into a notional contract standard. In practice, the mathematics of conversion factor adjustments dictate that unless the yield-to-maturity curve for the asset class is essentially a flat horizontal line, one bond will often be clearly the cheapest to deliver for a short position to fulfil physical delivery obligations. Any other bond delivery would cost the futures short participant more money to deliver in the delivery obligation.

For example, in September of 1998 and June of 1999 a squeeze was exerted on the CTD German Government Bond ("Bund") underlying the Deutsche Terminborse (DTB: now Eurex AG) Ten year maturity German Government bond futures contract. The CTD six percent coupon (Jul. 4, 2007) maturity bond was bought heavily and locked away by market participants in the cash markets and also borrowed heavily in the repurchase (funding) markets for sell-back dates past the futures delivery date. The resulting increase in value of the September 1998 and June 1999 futures contracts, with respect to the rest of the market, was so noticeable that it undermined the status and market standard of the futures contract itself. The DTB was forced to set artificial position limits on subsequent futures contracts to avoid another squeeze. Futures market participants' exposure in this contract was therefore narrowed to this particular CTD bond, even when the futures contract standard was for a wider selection of deliverable assets. Market participants hedging underlying bond positions in these DTB (now Eurex AG) futures contracts are also now subject to artificial position limits that can curtail their hedging strategies. Such limits may also affect the price of the futures contracts with respect to the underlying assets in a seemingly arbitrary way upon invocation.

According to certain embodiments of the present invention, the structure of futures contract 30 obviates such limitation issues by providing a multiple asset class or multiple asset subclass investment vehicle that cannot be squeezed. Insulation from such a dilemma is provided for by multiple underlying deliverable assets, which cumulatively make up the total deliverable obligation.

Exchange platform 12 is a trading architecture that facilitates the purchase and sale of one or more futures contracts 30. Exchange platform 12 is operable to receive and to process requests associated with transactions relating to futures contract 30. Exchange platform 12 may be a computer, a server, a management center, a single workstation, or a headquartering office for any person, business, or entity that seeks to manage the trading of futures contract 30. Accordingly, exchange platform 12 may include any suitable hardware, software, personnel, devices, components, elements, or objects that may be utilized or implemented to achieve the operations and functions of an administrative body or a supervising entity that manages or administers a trading environment.

Exchange platform 12 may be owned and operated by any suitable entity having the authority to operate in the distribution of futures contracts. For example, exchange platform may be a recognized futures exchange, such as the CX (representing the Cantor Financial Futures Exchange). A connection may be present between exchange platform 12 and any other futures exchange (e.g. the Chicago Board of Trade (CBOT)), whereby information associated with any transaction that is proposed by buyer 16 or seller 18 is relayed to an appropriate exchange to consummate the transaction. Thus, exchange platform 12 may operate as a proxy between buyer 16/seller 18 and a corresponding exchange that can record and confirm a tendered purchase or sale of futures contract 30. Alternatively and where authorized, exchange platform 12 may perform such trade execution functions independently. Exchange platform 12 may also deliver real-time financial data to buyer 16 or seller 18 in order to provide pertinent financial information to be used to make decisions as to whether to purchase or to sell futures contract 30. This relay of financial information may be performed via price reporting/dissemination element 22 or any other suitable element. Data, such as pricing information, asset class, maturity data, historical quotes, or moving averages, for example, may be provided to buyer 16 and seller 18. Other financial data may also be readily delivered and based on particular needs. In order to deliver information that is accurate and timely, price reporting/dissemination element 22 may be coupled to a corresponding futures exchange communications link that carries such financial data. Alternatively, price reporting/dissemination element 22 may gather such critical information from any appropriate location (e.g. a server operable to deliver real-time information to investors) such that the desired financial data is delivered to buyer 16 or seller 18.

Communications network 14 is a communicative platform operable to exchange data or information between buyer 16/seller 18 and exchange platform 12. Communications network 14 represents an Internet architecture in a particular embodiment of the present invention, which provides buyer 16 or seller 18 with the ability to electronically execute trades or initiate transactions to be delivered to an authorized exchange trading floor. Alternatively, communications network 14 could be a plain old telephone system (POTS), which buyer 16 or seller 18 could use to perform the same operations or functions. Such transactions may be assisted by a broker associated with exchange platform 12 or manually keyed into a telephone or other suitable electronic equipment in order to request that a transaction be executed. In other embodiments, communications system 14 could be any packet data network (PDN) offering a communications interface or exchange between any two nodes in investment system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Buyer 16 and seller 18 are clients, customers, prospective investors, or entities wishing to access or to initiate a communication with exchange platform 12 to be delivered via communications network 14. Alternatively, buyer 16 and seller 18 may represent any device or object that seeks to initiate a communication on behalf of another entity or element, such as a program, a database, or any other component, device, element, or object capable of initiating a voice or a data exchange within investment system 10. Data, as used herein in this document, refers to any type of numeric, voice, or script data, or any other suitable information in any appropriate format that may be communicated from one point to another. In an example embodiment, buyer 16 and seller 18 are investors interested in purchasing or shorting futures contract 30. Buyer 16 and seller 18 may also be simply seeking to review performance characteristics of futures contract 30 or to ascertain specific details relating to the assets contained therein.

Buyer 16 and seller 18 may each be provided with an end user interface comprising a central processing unit (CPU). The end user interface may be employed by either buyer 16 or seller 18 in order to initiate transactions or to perform asset-monitoring functions within investment system 10. Alternatively, such an end user interface may be replaced with any other suitable interface or object that facilitates communications between buyer 16, seller 18, and any other element within investment system 10, such as: a cellular telephone, an electronic notebook, a personal digital assistant (PDA), or any other suitable device (wireless or otherwise), component, or element capable of accessing one or more elements within investment system 10. The end user interface may also comprise any suitable interface for a human user such as a display, a microphone, a keyboard, or any other appropriate terminal equipment according to particular configurations and arrangements. In addition, the end user interface may be a unique element designed specifically for communications involving the purchase or sale of futures contract 30. Such an element may be fabricated or produced specifically for financial applications involving buyer 16 and seller 18.

Futures module 20 includes processor 24 and memory element 28 in accordance with one example embodiment of the present invention. Futures module 20 is operable to receive requests from buyer 16 or seller 18 and to process those requests such that financial transactions involving futures contract 30 may be performed. Futures module 20 may have a link or a connection to a futures market trading floor, or some other suitable coupling to any suitable element that allows for such transactions to be consummated. The resultant futures contract 30 that is formulated may be suitably stored in memory element 28 after being properly managed and secured by processor 24. Processor 24 may also assist in processing any financial terms or conditions (e.g. desired interest rate, type of asset class, etc.) requested by buyer 16 or seller 18. In cases where futures module 20 is unable to match the requested financial parameters or tendered contract terms provided by buyer 16 or seller 18 with that which is available in the trading market place, futures module 20 may contact buyer 16 or seller 18 and notify either of the circumstances surrounding the inability to fulfill such an order.

It should be noted that the internal structure of futures module 20 is malleable and can be readily changed, modified, rearranged, or reconfigured in order to achieve its intended operations. Accordingly, futures module 20 may be equipped with any suitable component, device, application specific integrated circuit (ASIC), hardware, software, processor, algorithm, read only memory (ROM) element, random access memory (RAM) element, erasable programmable ROM (EPROM), electrically erasable programmable ROM (EEPROM), or any other suitable object that is operable to facilitate the operations of futures module 20. Considerable flexibility is provided by the structure of futures module 20 in the context of investment system 10. Thus, it can be easily appreciated that futures module 20 could be readily provided external to exchange platform 12 such that communications involving buyer 16 and seller 18 could still be accommodated and handled properly. In other embodiments, futures module 20 could perform one or more of the tasks provided by price reporting/dissemination element 22 such that accurate pricing information and other relevant financial data could be adequately communicated to buyer 16 and seller 18.

In an alternative embodiment, communications network 14 and/or futures module 20 may be replaced entirely or partially with a person, providing a human interface to a corresponding futures trading exchange. In such an embodiment, an agent of exchange platform 12 or any other suitable person or representative may be contacted by buyer 16 or seller 18 (e.g. via the telephone, a network, other suitable electronic equipment, or directly by word of mouth). The agent or representative may receive a request from buyer 16 or seller 18 to execute some transaction involving futures contract 30. The agent or representative may then proxy or broker the request to an appropriate futures trading floor for execution of the transaction. The agent or representative may then record the transaction once it has been consummated and contact buyer 16 or seller 18 to confirm that the transaction has been executed. A receipt may then be issued to buyer 16 or seller 18 indicating the terms of futures contract 30.

Clearing house 36 is an element that cooperates with exchange platform 12 in order to ensure a fair and proper execution of transactions and trades initiated by buyer or seller 18. Futures exchanges generally have a clearing association (i.e. similar to clearing house 36), which operates in conjunction with the futures exchange in a manner similar to a bank clearing house. Membership in the clearing association is generally composed of well-capitalized members of the exchange and corporations or partnerships, one of whose officials is often an exchange member. Exchange members who do not join the clearing association can clear their trades through a member of the association. Each member of clearing house allocates fixed original margins and maintains them with clearing house 36 in the event of adverse price fluctuations. In such instances, clearing house 36 may call for additional margins throughout the day without waiting for a routine end-of-day settlement.

In operation of an example embodiment of futures contract 30, such an investment vehicle may be applied to a particular credit sector. If a traditional futures contract was based upon a standard of four to five-and-one-half year maturity of United States corporate debt from issuers of a certain type or of a certain S&P and/or Moody's credit standard, then a particular CTD issue for the contract would likely result. Trading opportunities in the contract would also be present from both new corporate issues qualifying for the contract delivery and from issue ratings upgrades or downgrades from the ratings agencies. Due to the smaller outstanding issue size of many corporate bond issues, the likelihood of a squeeze on the CTD would be accentuated.

Using futures contract 30 such a squeeze can be effectively avoided, whereby the deliverable bond standard is expanded along with the asset classes deliverable in futures contract 30. A cumulative five-year maturity asset futures contract structure is implemented in futures contract 30 and based on a four to five-and-one-half year maturity deliverable instruments standard for senior debt obligations and five-year maturity derivative contracts issued by/on a particular corporate sector. For example, a telecom credit futures contract may consist of World Telecom companies (such as France Telecom, British Telecom, Deutsche Telecom, Verizon, Vodafone, Nokia, ATT, etc.). Such a configuration could take the form, for example, of 50% corporate telecom bonds (of a certain minimum size outstanding) and 50% corporate telecom Credit Default Swaps (CDS) using reference obligations sourced from the first two categories. Note that in this example, futures contract 30 represents a multiple asset structure, whereby fixed income bonds represents the first asset class (making up 50% of futures contract 30) and the CDSs represent the second asset class (also making up 50% of futures contract 30).

The pricing methodology for futures contract 30 in this example may be provided in basis points per annum. The bond portion of futures contract 30 may be represented by a basis points spread difference of the yield to maturity of the six percent coupon (five-year maturity) delivery standard. This is with reference to the United States fixed rate achievable for funds for five years, in exchange for floating rate payments every six months at each six month United States London Inter-Bank offered rate as re-fixed. Using a par-par asset swap structure and the basis points over Libor standard for fixed income asset pricing, the bond sector deliverables may be priced as a basis-points-per-annum yield spread that the bond effectively pays over this five-year fixed-for-floating Libor rate.

On delivery of a bond from the delivery basket into a future short position, the delivery price (in the notional six percent five-year futures example) of that bond may be calculated by: 1) ascertaining a traditional bond futures price for a six percent coupon five-year maturity standard bond from the "yield spread over Libor" EDSP of futures contract 30, and the five-year International Swaps and Derivatives Association (ISDA) United States fixed-for-floating rate of that day (standard asset swap structure calculations may be performed by using the ISDA fixing rates for the whole fixed-for-floating rate yield curve up to five-year maturity on the futures delivery day); and 2) applying a standard futures conversion factor algorithm to adjust the value paid for a delivered bond to that ascertained above for the six percent five-year notional futures.

The CDS half of futures contract 30 may be represented by basis points per annum of the five-year United States nominal CDS contract, as paid by a protection buyer (futures short position) to the protection seller (futures long position) on any of the underlying basket's corporate entities. When delivery of the CDS half of futures contract 30 is executed, a futures short may buy five-year CDS protection from an opposing long counterparty. This may be done for the designated reference entity he chooses, agreeing to pay the futures long counterparty the EDSP basis points per annum on the notional amount "in delivery."

As CDS contracts may be counterparty credit sensitive, a cash settlement option (at the current CDS market price as polled by the facilitating futures exchange in the CDS marketplace) may be exercisable by the short futures participant, in the event that the long (to which he has been matched in the delivery process) has either: a) a closely correlated credit perception with the reference entity used in the CDS delivery process (for example, the buyer is British Telecom Treasury with the deliverable reference entities all being Telecom companies, and the CTD potentially is British Telecom itself), or b) there exists, at the time of delivery, a bilateral credit restriction between the two counterparties that would stop the contract being written.

In cases where it is likely that a CTD instrument for the deliverable basket would be identified for the bond (or syndicated loan) asset class baskets of deliverable debt obligations, the nature of the CDS asset class is such that these derivatives can be created between counter-parties at will. Note that any rise in the futures price due to a squeeze on an underlying bond or syndicated loan would manifest a higher price paid on terminal delivery for the underlying CDS asset class sector. This would create an incentive for market participants to sell futures contract 30 in order to deliver CDS contracts (exchange a yearly basis points fee for credit protection on the reference entity) at an advantageous arbitrage against their short position.

This futures contract 30 delivery reflects CDS contracts where the futures short market participant has agreed to buy, at the futures terminal delivery date, protection against default of the reference entity (and is, thus, paying money) for as long as the reference entity is not in default. When in default, the holder could "put" the reference entity asset at par value to the credit protection seller. The price difference between a CDS and the par-par asset swap price of the underlying entity reference obligations is referred to as the "basis," and is an often arbitraged spread trade amongst professional market participants. Futures contract 30 in this example, therefore, also reflects this "basis" in its pricing methodology.

It is again noteworthy to identify that the above example implementation of the hybrid structure of futures contract 30 is an example embodiment of the invention used only for purposes of discussion and teaching. Futures contract 30 may be applied to a host of other asset classes and inclusive of, for example, total return swaps, convertible bonds, subordinated debt, equity, syndicated loans, futures contracts provided across currency sectors to enable cross currency baskets of the same asset class (e.g. G7: ten year bonds from the seven main economies of the world), or other cross currency debt obligations from multiple countries.

For example, in another embodiment, the futures contract employs deliverable bond obligations of a ten-year maturity from each of a group of three major economies (e.g., Germany, United States, and Japan). The contract's three deliverable baskets thus span across currency sectors to enable cross-currency baskets of the same asset class (e.g., the group of three main economies' ten-year fixed income bonds). Thus, the contract has not only an interest rate component, but also a foreign exchange component. The futures contract of this embodiment is preferably based upon a deliverable standard of 8.5 to 10.5 year maturity bonds, with a nominal six percent coupon contract standard. A conventional conversion factor approach may also be used to attempt to equalize the deliverability of each qualifying bond in each of the three currency baskets. Each basket is delivered in its own currency of origin. The final contract value as delivered is made up of the bonds delivered. Any foreign exchange changes from inception of a futures position to delivery date are inherent in the contract. For the same reasons as those discussed above, the contract is far less susceptible to CTD squeezes.

FIG. 2 is a simplified block diagram of an example futures contract 30. Futures contract 30 represents the legal instrument that may be used to bind buyer 16 or seller 18 to a stipulated agreement. Futures contract 30 may take any appropriate form such as a written document, an e-mail, a facsimile message, a computer display, an entry in an account, or a verbal agreement between two parties. Futures contract 30 provides considerable flexibility in its terms, representations, and stipulations. In general, any information or data that may be germane or of interest to a futures contract participant may be included in futures contract 30, provided that the included terms are mutually agreeable to the two (or more) parties bound by futures contract 30.

In one embodiment, used for purposes of teaching and example only, futures contract 30 includes a listing of asset classes, or subclasses, which are to be included in the agreement. In the example provided, the asset subclasses are listed numerically and represent a German government bond, an Italian government bond, and a French government bond. Note that in this example, the German, Italian, and French bonds are subclasses within a single asset class. The asset subclasses would be part of a single asset group, namely fixed income government bonds. Each row that lists the asset subclass includes a maturity parameter, a percentage rate being offered by the bond, and a price associated with one block of the asset, which may be determined by an administrator of futures module 20 or a trading exchange.

Futures contract 30 may also include a number of additional provisions, stipulations, or conditions, which may include items such as settlement terms 40, delivery terms 50, exchange fees 60, limitations 70, and miscellaneous items 80. A myriad of other potential segments may be provided within futures contract 30, as the embodiment of FIG. 2 represents simply one example arrangement of futures contract 30. Such variations may be based on the particular needs of the parties implicated by futures contract 30.

In accordance with the example implementation of FIG. 2, futures contract 30 represents an agreement to purchase long-term debt, carrying a notional six percent coupon for bullet (non-callable non-putable) Euro Government debt for Germany, France, and Italy. These debt instruments are provided in this example with a maturity range between twenty-five and thirty-five years.

Settlement terms 40 may include information relating to contract size (e.g. EUR 100,000). Short positions at expiration may be required to deliver domestic government bonds issued by Germany, France, and Italy at delivery and a minimum issued size, for example, of Euro (€) 3 billion. In this example embodiment, each delivery comprises a third of each deliverable country sector debt, with a tolerance (for example) of up to +/−1%. Settlement terms 40 may also include a quotation, reflecting a percentage of par value to two decimal places.

Another term that could be included in settlement terms 40 is any provision relating to the last available trading day. In one example, three exchange trading days prior to the delivery day of the relevant month could be provided for futures contract 30. Trading in futures contract 30 for the delivery month could cease at 11:30 AM (CET). Daily settlement prices could also be accounted for in settlement terms 40. An appropriate algorithm could be used to offer a volume-weighted average price of the last five minutes of the day. If more than ten trades have occurred during the final minute of trading, then the volume-weighted average price of all trades that occurred during that last minute could be used. If realistic market conditions are deemed not to have been observed, then an administrator of the futures exchange can establish the settlement price according to current market values of the underlying cash bonds.

Delivery terms 50 may include information relating to the delivery day associated with futures contract 30. For example, the $10^{th}$ calendar day of the delivery month may be designated as the delivery day. Delivery months could also be specified by delivery terms 50 and provided, for example, as the three successive months within the cycle March, June, September, and December. Delivery notification could also be accounted for, where open short positions would notify the proper entity of the debt instruments they will deliver by the end of trading on the last trading day in that delivery month. The delivery process could also be specified in delivery terms 50. For example, Euroclear delivery versus payment on the delivery day could be designated. Delivery failures could allow a futures exchange to enforce delivery of another bond of that country sector. If another bond is unavailable, the sector immediately above in credit perception could be used. The futures exchange could allocate penalties, or compensations, to apply in the absence of bond substitution availability.

Delivery settlement price could be accounted for in delivery terms 50 using an algorithm that offers a volume-weighted average price of the last five minutes of the day. If more than ten trades have occurred during the final minute of trading, then the volume-weighted average price of all trades that occurred during that last minute can be used. If realistic market conditions are deemed not to have been observed (i.e. if no bids and offers were present in the last five minutes), an authoritative entity could establish the stock price via a median price polling algorithm of the underlying cash bonds using information provided by market practitioners.

Exchange fees 60 may include information relating to conversion factors, for example, stipulating that the price of the bond (at 6.00% yield-to-maturity) on the designated delivery day. Italian government bonds (also referred to as "BTPs") could use the Bloomberg Market Standard annualized true gross yield to price calculation for their conversion factors. Exchange terms may also include payment stipulations for allocations made the day after the last day of trading. Actual exchange fees may be provided, for example, on a per lot basis.

Limitations 70 may include information relating to items such as margining requirements. For example, an initial margin having a designated amount per contract may be provided. Normal variation margin procedures may be implemented and in accordance with clearing house 36 procedures and guidelines. Daily price limit guidelines may also be provided for within limitations 70 or designated as infinite in other scenarios. Position limits may also be accounted for in limitations 70.

Miscellaneous items 80 may include any other suitable information chosen or selected by buyer 16, seller 18, or an administrator of exchange platform 12. For example, trading hours and vacation days could be specified in such a section. Other information provided in miscellaneous items 80 may be offered where appropriate and based on particular needs.

Note that the example embodiments described above can be replaced with a number of potential alternatives where appropriate. The configurations discussed herein only offer some of the numerous potential applications of futures contract 30. Any number of additional structures may also be readily accommodated by futures contract 30. One such example structure could include thirty-year United States treasury bonds, thirty-year United Kingdom government gilt bonds, thirty-year French government bonds, thirty-year German government bonds, thirty-year Japanese government bonds, etc. (providing for a G7 (the group of seven industrial nations) architecture. Thus, a basket of different currency bonds may be provided for in a single futures contract 30. In other scenarios, futures contract 30 may include mutual fund shares in combination with stock securities and corporate debt. Any number of combinations, permutations, and groupings of asset classes or asset subclasses may be implemented in accordance with the teachings of futures contract 30.

FIG. 3 is a simplified flowchart illustrating a series of example steps associated with one implementation of investment system 10. The example of FIG. 3 references a futures contract 30, which is a multiple asset class investment instrument that may be electronically traded. In such an implementation, futures contract 30 is made up of three constituent asset subclasses of European debt of a maturity of thirty years at the time of contract expiration. Futures contract 30 may also have a traditional notional six percent coupon. While the deliverable bonds are sourced from European debt, there may be three deliverable sectors within the one futures contract 30 that are utilized for delivery. Thus, at step 100 a buyer may initiate a request to purchase futures contract 30 (i.e. a long position) in hopes that its underlying asset structure appreciates. Rather than allowing one deliverable bond, sourced from the three different eligible country debt classes, a bond from each country sector may be delivered as the terminal delivery obligation associated with futures contract 30.

In this example scenario, it is presumed that the Italian sector tends to be the higher yielding sector due to an impaired credit perception of Italy, as it relates to Germany and France. A traditional futures contract based upon these three market sectors would exhibit the Italian bond of the shortest duration as clearly the CTD bond in a normal upwardly sloping yield curve, which would enhance the possibility of a squeeze on this underlying CTD bond. This would have the effect of reducing liquidity/participation characteristics of the market.

At step 102, a request may be communicated from buyer 16 to exchange platform 12, the request traversing communications network 14. At step 104, the request may be received by futures module 20, which may attempt to match the proposed terms with an available futures contract 30 that satisfies the request. Note that because futures contract 30 is based upon three deliverable sectors, and all three delivery obligations are performed by market participants at contract termination. Squeezing the Italian sector CTD would have the effect of also increasing the price paid for the German and French sector CTDs. Futures short position participants have the ability to balance delivery losses associated with purchasing highly priced Italian CTD bonds with delivery profits associated with purchasing relatively lower priced German and French CTD bonds, relative to the futures contract price that reflects all three sectors at once.

If a futures long market participant chose to squeeze futures contract 30, they would need to buy all three sector CTDs in considerable size to do so. The effect of buying just one sector is negated by a higher price on delivery of the other two. The total outstanding amounts of the deliverable bonds is their cumulative outstanding amounts, making it more difficult to corner any particular futures delivery, and also allowing representation of a broader range of thirty year European government debt.

At step 106, buyer 16 may be duly authenticated by an administrator of exchange platform 12 such that he is approved for the proffered transaction. The request may then be sent to a futures trading exchange to consummate the proposed transaction at step 108. Alternatively, exchange platform 12 may execute such a transaction in cases where it is authorized to do so. At step 110, a confirmation of the execution of the transaction may be received and forwarded to buyer 16. Buyer 16 may then maintain his long position in futures contract 30 until buyer 16 opts to exit futures contract 30 by selling the asset. Settlement terms may be reached and a price agreed upon as described above with reference to FIG. 2, whereby various protocols may be used to determine such elements.

Note that the raising in price of one sector CTD allows another bond within that sector to come into play as a deliverable possibility. If one CTD Italian bond is squeezed, and the price of the bond relative to the rest of the market rises, then the price of futures contract will rise to the point where the next cheapest to deliver bond for that sector becomes more of an economic possibility. This is due in part to the profits that become accumulated in the other two country sector deliveries, whereby the futures price is measurably higher and no longer reflects a fair value of the three sector CTDs.

As described above, the elements and operations listed in FIGS. 1 and 3 may be achieved with use of investment system 10 in any number of contexts and applications. Accordingly, communications capabilities, data processing features and elements, suitable infrastructure, adequate personnel and management, and any other appropriate software, hardware, or data storage objects may be included within investment system 10 to effectuate the tasks and operations of the elements and activities associated with futures contract 30. Accordingly, FIG. 1 provides only one example of a suitable processing and communications platform from which futures contract 30 may be traded.

Although the present invention has been described in detail with reference to particular embodiments in FIGS. 1-3, it should be understood that various other changes, substitutions, and alterations may be made hereto without departing from the sphere and scope of the present invention. For example, although the preceding FIGURES have referenced a number of bond structures that serve as a basis for futures contract 30, any suitable financial instruments, debts, securities, stocks, or commodities may be readily substituted for such bonds and, similarly, benefit from the teachings of the present invention.

Additionally it should be noted that although the example embodiments have described an example trading exchange platform 12, any suitable entity could facilitate transactions involving futures contract 30. For example, private entities that are authorized to trade in futures may readily implement such a financial architecture without departing from the teachings of investment system 10. In still other scenarios, numerous other participants could be included within the rubric of buyer 16 and seller 18. For example, pension fund representatives, shareholders, mutual fund managers, and any other appropriate investing entity may participate in such a futures market.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims. In order to assist the United States Patent and Trademark Office (USPTO) and additionally any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of filing hereof unless the words "means for" or "step for" are specifically used in the particular claims; and (b) does not intend by any statement in the specification to limit his invention in any way that is not otherwise reflected in the appended claims.

What is claimed is:

1. A method, comprising:
   receiving by at least one processor via a communications network from respective computing devices a plurality of requests to buy and to sell a futures contract,
      wherein a buyer of the futures contract agrees to (i) buy one of a plurality of assets from a first asset class underlying the futures contract and (ii) buy one of a plurality of assets from a second asset class underlying the futures contract at an expiration of the futures contract,
      wherein a seller of the futures contract agrees to (i) sell one of a plurality of assets from the first asset class underlying the futures contract and (ii) sell one of a plurality of assets from the second asset underlying the futures contract at the expiration of the futures contract,
      wherein the first asset class comprises fixed income bonds,
      wherein the second asset class comprises credit default swaps issued on fixed income bonds, and
      wherein the futures contract specifies:
         (i) a quantity of a fixed income bond from the first asset class to be delivered at the expiration of the futures contract, and
         (ii) a quantity of a credit default swap from the second asset class to be delivered at the expiration of the futures contract;
   executing by the at least one processor a transaction involving at least one of the plurality of requests to sell the futures contract;
   providing by the at least one processor to a respective computing device a confirmation of execution of the transaction involving the at least one request to sell the futures contract;
   executing by the at least one processor a transaction involving at least one of the plurality of requests to buy the futures contract; and
   providing by the at least one processor to another respective computing device a confirmation of execution of the transaction involving the at least one request to buy the futures contract.

2. The method of claim 1,
   wherein the at least one request to sell the futures contract comprises proposed contract terms;
   wherein the at least one request to buy the futures contract comprises proposed contract terms; and
   wherein the method further comprises:
      matching one or more of the proposed contract terms of the at least one request to sell with an available futures contract that satisfies the proposed contract terms of the at least one request to sell; and
      matching one or more of the proposed contract terms of the at least one request to buy with an available futures contract that satisfies the proposed contract terms of the at least one request to buy.

3. The method of claim 1, further comprising:
   storing the transaction involving the at least one request to sell; and
   storing the transaction involving the at least one request to buy.

4. The method of claim 1, further comprising:
   providing to at least one of the plurality of computing devices financial data on the futures contract.

5. The method of claim 1,
   wherein the first asset class has a value associated therewith;
   wherein the second asset class has a value associated therewith; and
   wherein a change in the value in one of the first asset class or the second asset class due to a cheapest to deliver parameter results in a change in the value of the other asset class.

6. The method of claim 1, wherein the futures contract includes a pricing methodology that is based on basis points per annum, the pricing methodology being used at least partially to determine a price for the futures contract.

7. The method of claim 1, wherein the futures contract includes a settlement term indicating that a settlement price of the futures contract be based at least in part on a volume-weighted average price of a plurality of trades associated with the futures contract.

8. The method of claim 1, wherein the first asset class comprises fixed income bonds issued by at least one corporation.

9. A method, comprising:
receiving by at least one processor via a communications network from respective computing devices a plurality of request to buy and to sell a futures contract,
wherein a buyer of the futures contract agrees to (i) buy one of a plurality of assets from a first asset class underlying the futures contract and (ii) buy one of a plurality of assets from a second asset class underlying the futures contract at an expiration of the futures contract;
wherein a seller of the futures contract agrees to (i) sell one of a plurality of assets from the first asset class underlying the futures contract and (ii) sell one of a plurality of assets from the second asset class underlying the futures contract at the expiration of the futures contract,
wherein the first asset class comprises fixed income bonds issued by a first government,
wherein the second asset class comprises fixed income bonds issued by a second government, and
wherein the futures contract specifies:
(i) a quantity of a fixed income bond from the first asset class to be delivered at the expiration of the futures contract, and
(ii) a quantity of a fixed income bond from the second asset class to be delivered at the expiration of the futures contract;
executing a transaction involving at least one of the plurality of requests to sell the futures contract;
providing to a respective computing device a confirmation of execution of the transaction involving the at least one request to sell the futures contract;
executing a transaction involving at least one of the plurality of requests to buy the futures contract; and
providing to another respective computing device a confirmation of execution of the transaction involving the at least one request to buy the futures contract.

10. The method of claim 9,
wherein the at least one request to sell the futures contract comprises proposed contract terms;
wherein the at least one request to buy the futures contract comprises proposed contract terms; and
wherein the method further comprises:
matching one or more of the proposed contract terms of the at least one request to sell with an available futures contract that satisfies the proposed contract terms of the at least one request to sell; and
matching one or more of the proposed contract terms of the at least one request to buy with an available futures contract that satisfies the proposed contract terms of the at least one request to buy.

11. The method of claim 9,
wherein the method further comprises:
storing the transaction involving the at least one request to sell; and
storing the transaction involving the at least one request to buy.

12. The method of claim 9,
wherein the buyer of the futures contract further agrees to buy one of a plurality of assets from a third asset class underlying the futures contract at the expiration of the futures contract;
wherein the seller of the futures contract further agrees to sell one of a plurality of assets from the third asset class underlying the futures contract at the expiration of the futures contract;
wherein the third asset class comprises fixed income bonds issued by a third government; and
wherein the futures contract further specifies a quantity of a fixed income bond from the third asset class to be delivered at the expiration of the futures contract.

13. The method of claim 12,
wherein the first asset class comprises fixed income bonds issued by the U.S. government;
wherein the second asset class comprises fixed income bonds issued by the German government; and
wherein the third asset class comprises fixed income bonds issued by the French government.

14. The method of claim 12,
wherein the first asset class comprises fixed income bonds issued by the Italian government;
wherein the second asset class comprises fixed income bonds issued by the German government; and
wherein the third asset class comprises fixed income bonds issued by the French government.

15. The method of claim 12,
wherein the first asset class comprises fixed income bonds issued by a first European government;
wherein the second asset class comprises fixed income bonds issued by a second European government; and
wherein the third asset class comprises fixed income bonds issued by a third European government.

16. The method of claim 15, wherein the third European government is the Italian government.

17. The method of claim 12,
wherein the first asset class comprises fixed income bonds issued by a European government;
wherein the second asset class comprises fixed income bonds issued by the U.S. government; and
wherein the third asset class comprises fixed income bonds issued by the Japanese government.

18. The method of claim 9, further comprises:
providing to at least one of the plurality of computing devices financial data on the futures contract.

19. The method of claim 9,
wherein the first asset class has a value associated therewith;
wherein the second asset class has a value associated therewith; and
wherein a change in the value in one of the first asset class or the second asset class due to a cheapest to deliver parameter results in a change in the value of the other asset class.

20. The method of claim 9, wherein the futures contract includes a pricing methodology that is based on basis points per annum, the pricing methodology being used at least partially to determine a price for the futures contract.

21. The method of claim 9, wherein the futures contract includes a settlement term indicating that a settlement price of the futures contract be based at least in part on a volume-weighted average price of a plurality of trades associated with the futures contract.

22. The method of claim 9,
wherein the first asset class comprises fixed income bonds issued by a first European government; and
wherein the second asset class comprises fixed income bonds issued by a second European government, wherein the second European government is the Italian government.

23. The method of claim 9,
wherein the first asset class comprises fixed income bonds issued by one of a European government and the Japanese government; and
wherein the second asset class comprise fixed income bonds issued by the U.S. government.

* * * * *